United States Patent [19]

Matsui et al.

[11] 4,118,438
[45] Oct. 3, 1978

[54] TRANSPARENT NON-BLOCKING POLYPROPYLENE FILM AND ITS PREPARATION

[75] Inventors: Takeshi Matsui; Kunihiko Arakawa, both of Inuyama, Japan

[73] Assignee: Toyo Boseki Kabushiki Kaisha, Osaka, Japan

[21] Appl. No.: 779,625

[22] Filed: Mar. 21, 1977

Related U.S. Application Data

[63] Continuation of Ser. No. 629,249, Nov. 6, 1975, abandoned, and a continuation-in-part of Ser. No. 535,594, Dec. 23, 1974, which is a continuation of Ser. No. 287,152, Sep. 7, 1972.

[51] Int. Cl.$^2$ .................. C08L 77/00; C08L 23/00
[52] U.S. Cl. ................ 260/857 L; 260/873; 260/897 R; 264/210 R; 264/211; 264/176 R; 264/184; 264/288; 264/289; 428/338; 428/339; 428/327; 428/910; 428/918
[58] Field of Search .............. 428/323, 339, 407, 402, 428/918, 910, 474, 338, 327; 260/873, 857 L, 897 R; 264/210 R, 211, 176 R, 288, 184, 289; 156/229, 244

[56] References Cited

U.S. PATENT DOCUMENTS

| | | | |
|---|---|---|---|
| 3,136,735 | 6/1964 | Stolt | 260/857 L |
| 3,471,426 | 10/1969 | Hofton | 260/857 L |
| 3,637,906 | 1/1972 | Le Paratheon | 260/857 L |
| 3,741,841 | 6/1973 | Toyoda et al. | 428/323 |
| 3,845,180 | 10/1974 | Pinsky | 264/210 R |

FOREIGN PATENT DOCUMENTS 676,080  12/1963  Canada .................. 260/857 L

*Primary Examiner*—Stanley S. Silverman
*Attorney, Agent, or Firm*—Barry Kramer

[57] ABSTRACT

Process for preparing a transparent polypropylene film having good slip and non-blocking properties which comprises admixing polypropylene with a thermoplastic resin in the melt state, the thermoplastic resin having a melting point higher than but no more than 100° C higher than the melting point of the polypropylene and being substantially incompatible with the polypropylene under the mixation condition, to give a polypropylene composition where the thermoplastic resin is dispersed in the form of fine particles of 0.1 to 10 $\mu$ in average particle size and the amount of the dispersing thermoplastic resin is from 0.01 to 1% by weight of the polypropylene, extruding the resultant composition in the melt state into a film and stretching the film in at least one direction.

7 Claims, No Drawings

TRANSPARENT NON-BLOCKING POLYPROPYLENE FILM AND ITS PREPARATION

This is a continuation of application Ser. No. 629,249, filed Nov. 6, 1975, now abandoned, and a continuation-in-part application of U.S. patent application Ser. No. 535,594 filed on Dec. 23, 1974, which is in turn a continuation application of U.S. patent application Ser. No. 287,152 filed on Sept. 7, 1972.

The present invention relates to a transparent stretched polypropylene film having good slip and non-blocking properties and its preparation.

Polypropylene films are widely used as packaging materials due to their advantageous physical properties such as good transparency, high surface hardness and excellent mechanical strength. Because of the non-polarity of polypropylene, however, they can be printed and adhered with difficulty. For improving such disadvantageous property, they are usually subjected to treatment with corona discharge. As the result, their surface is made tacky and apt to cause blocking on storage so that their separation becomes markedly difficult. This tendency is remarkable particularly when an antistatic agent is incorporated. In order to be practically useful, they are desired to be sufficiently low in the friction coefficient between each sheet of them and show non-blocking and anti-sticking properties.

For improving the slip and non-blocking properties of the polypropylene films, it is proposed to make the surface of the films uneven. However, when the degree of the unevenness is too large, they loose their transparency and surface gloss, and on the other hand, when the degree of unevenness is too small, the slip and non-blocking properties of the films are little improved. In order to obtain the desired transparent polypropylene films having improved slip and non-blocking properties by making the surface thereof uneven, it is necessary to control the degree of unevenness in an optimum range. An object of the present invention is to give the optinum degree of unevenness uniformly and stably onto the surface of the transparent polypropylene film without difficulty in the production process and thereby to obtain the desired transparent polypropylene film having improved slip and non-blocking properties.

Besides, for providing polypropylene films with such favorable properties, an attempt has been made to blend fine particles of inorganic materials into a polypropylene composition. Since, however, fine particles of inorganic materials are inclined to flocculate, it is difficult to disperse them uniformly into the polypropylene composition. Further, the particle size of inorganic materials in a polypropylene composition is entirely associated with their particle size before blending and can be hardly controlled in the course of blending. Moreover, the transparency inherent to polypropylene is lost in the resultant polypropylene film due to the difference in refractive index between polypropylene and the inorganic materials blended therewith and also due to the voids formed in the film during stretching. When the voids are formed in the film during stretching, the transparency of the film is remarkably decreased. The voids are formed on nuclei of the inorganic materials, and the amount of voids are affected by various factors, such as the affinity (interfacial adhesion) of polypropylene to the inorganic materials (when the affinity is larger, the voids are more hardly formed), the particle size of the inorganic materials (when the particle size of the inorganic materials is small, the voids are more hardly formed), the amount of the inorganic materials (when the amount of the inorganic materials is less, the voids are more hardly formed), the temperature of the films at the stretching (when the temperature is higher, the voids are more hardly formed) and the draw ratio of the films (when the draw ratio is smaller, the voids are more hardly formed).

As the results of the study seeking a polypropylene film provided with good slip and non-blocking properties while maintaining a good transparency inherent to polypropylene, it has been found that, when a mixture of polypropylene and a thermoplastic resin (0.01 to 1% based on the weight of the polypropylene) having a melting point higher than that of polypropylene and being substantially incompatible with polypropylene on melting is heated at a temperature higher than the melting point of the thermoplastic resin and then stirred, the thermoplastic resin becomes fine particles, which are dispersed uniformly in the polypropylene. It have also been found that the film formed from such mixture has very fine and minute lumps on the surface and the lumps are effective in prevention of blocking, and further that the transparency of the film is little decreased, i.e. the good transparency of the film is maintained, which may be owing to not only the fact that the refractive index of the thermoplastic resin is nearer to that of the polypropylene than that of the inorganic materials but also the fact that the voids are little formed during stretching. That is, the void is more hardly produced by the addition of the thermoplastic resin than the case of the addition of the inorganic materials. The present invention is based on these findings.

According to the present invention, there is provided a polypropylene film wherein fine particles of a thermoplastic resin having a melting point higher than that of polypropylene and being substantially incompatible with polypropylene on melting are uniformly dispersed in an amount of 0.01 to 1% by weight based on the weight of polypropylene.

The polypropylene used in this invention may be a polypropylene containing not less than 80% by weight of isotactic polypropylene or its mixture with a poly-$\alpha$-olefin other than polypropylene. The polypropylene may be also a copolymer of propylene and $\alpha$-olefin other than propylene wherein the content of the $\alpha$-olefin is up to 5 mol %.

The thermoplastic resin used in this invention is required to be the one having a melting point higher than but no more 100° C. higher than that of polypropylene, preferably from 30° to 70° C. higher than that of polypropylene, and being substantially incompatible with polypropylene when melted.

The thermoplastic resins having a melting point of 100° C. or more higher than that of polypropylene are not suitable, because a higher temperature is required for the dispersion thereof into polypropylene which induces the thermal degradation of polypropylene, and on the other hand, the thermoplastic resins having a melting point of lower than that of polypropylene are not suitable either, because such thermoplastic resins tend to have too small particle size and therefore are little effective for improving the slip and non-blocking properties of the polypropylene films. Besides, the thermoplastic resins having a good compatibility with polypropylene are not suitable either, because they are not dispersed in polypropylene in the particle shape having an appropriate particle size, but are dispersed in polypropylene in the thread shape or microparticle shape, and therefore, they are little effective for improving the slip and non-blocking properties of the polypropylene films.

The incompatibility of the polypropylene with the thermoplastic resin may be confirmed experimentally but can be presumed on a solubility parameter which is calculated from a molar attraction content of the atoms or atomic groups in a polymer. Thus, the polypropylene and the thermoplastic resin show generally a sufficient incompatibility when the difference between them in solubility parameter is 2.0 or more.

Examples of the thermoplastic resin are polyamides such as polycapramide (i.e. nylon 6) (M.P. 215° C.), polyhexamethylene adipamide (i.e. nylon 66) (M.P. 260° C.), polyhexamethylene sebacamide (i.e. nylon 610) (M.P. 235° C.) and the copolymers of the monomeric components in the polymers, polyesters such as polyethylene terephthalate (M.P. 258° C.), polyethylene terephthalate/isophthalate (M.P. 190°–250° C.), polytetramethylene terephthalate (M.P. 230° C.) and poly-1,4-cyclohexylenedimethylene terephthalate (M.P. 250° C.), polyether esters such as polyethylene oxybenzoate (M.P. 225° C.), etc.

The amount of the thermoplastic resin to be admixed with the polypropylene may be from 0.01 to 1% by weight based on the weight of the polypropylene. When the amount is more than the said upper limit, the transparency of the film obtained from the resulting mixture is poor. When less than the said lower limit, a satisfactory non-blocking, good slipping and anti-sticking properties can not be obtained.

Into the mixture of the thermoplastic resin with the polypropylene, there may be incorporated any additives, of which a typical example is a cationic, anionic, non-ionic, amphoteric or amphoteric metallic antistatic agent. The incorporation of a non-ionic antistatic agent such as polyoxyethylene alkylamide, polyoxyethylene alkylamine or an aliphatic ester of glycerol is particularly preferred. The amount of the antistatic agent may be usually from 0.01 to 5.0% by weight, preferably from 0.05 to 1.5% by weight of the polypropylene. The use of the antistatic agent in a too much amount will decrease the non-blocking property.

In order to disperse the thermoplastic resin into the polypropylene as fine particles, their mixture is heated at a temperature higher than the melting point of the thermoplastic resin and then stirred well. For these operations, there may be used a conventional extruder. Thus, the mixture is charged in the extruder, melted, stirred with a screw and extruded from a die through a filter whereby the thermoplastic resin in fine particles is dispersed in the polypropylene.

Such phenomenon seems to be mainly due to the shearing force when the mixture goes through the narrow passage in the extruder, the filter, the nozzle or the like.

The average particle size of the thermoplastic resin is controlled to be from 0.1 to 10μ by adopting an appropriate mixation condition. When mixed under the same condition, the particle size is affected by the difference between the thermoplastic resin and the polypropylene in melting point as well as in solubility parameter. In order to obtain a desirable particle size, the melting point of the thermoplastic resin is to be higher than but no more 100° C. higher than the melting point of the polypropylene. Particularly preferred is from 30° to 70° C. higher than the melting point of the polypropylene.

The particle size of the thermoplastic resin is to be from 0.1 to 10μ, preferably from 0.8 to 3.0μ. When the particle size is less than the said lower limit, the slip and non-blocking properties are not satisfactory. A particle size more than the said upper limit results in the decrease of transparency.

Since the amount of the thermoplastic resin to be incorporated into the polypropylene is small, uniform dispersion of the thermoplastic resin may sometimes be hardly attained. In such case, the thermoplastic resin may be admixed with a part of the polypropylene and the resulting mixture may be further admixed with the remainder of the polypropylene. The extrusion of the thus obtained mixture in the melt state assures the uniform dispersion of the thermoplastic resin. As to the amount of the thermoplastic resin to be admixed with the polypropylene at the primary stage, i.e. for preparation of the master batch, there is no exact limitation, but it is favorable to be from about 5 to about 20 parts by weight to 100 parts by weight of the polypropylene.

When the thermoplastic resin is admixed with the polypropylene, the temperature is required to be higher than the melting point of the thermoplastic resin. In extruding into a film, however, the temperature is not required to be higher than the melting point of the thermoplastic resin and may be a conventional one usually adopted in the melt extrusion of the polypropylene. According to the master batch system, not only a small amount of the thermoplastic resin can be uniformly dispersed in the polypropylene, but also the thermal degradation of the polypropylene in the extruding step can be mostly inhibited.

The polypropylene composition wherein the fine particles of the thermoplastic resin are dispersed is melt-extruded into a film by a conventional procedure and then uniaxially or biaxially stretched. Since the thermoplastic resin has a better affinity to the polypropylene than the inorganic materials and is dispersed in the polypropylene as fine particles having a uniform particle size and further the particle shape thereof is somewhat modified during stretching, the voids are hardly produced. When the temperature of the films at stretching is higher, the voids are more hardly produced, but there is an upper limit of the temperature from the standpoint of the operability of stretching. The upper limit of the temperature of films at stretching may be usually 160° C. Thus, the stretching may be usually carried out at a temperature of films of about 135° to 155° C., preferably about 140 to 150° C. This temperature range may somewhat vary with the kind of apparatus, the thickness of film, the stretching speed, the amount of the thermoplastic resin, the particle size of the resin, the degree of the incompatibility of the resin with polypropylene, or the like. Besides, the temperature range is narrower than the temperature range (100° to 160° C.) of the case the film made of polypropylene alone is stretched to give a transparent film and is limited to the higher range of the latter. When the inorganic materials are added to the polypropylene, the production of voids can not completely be suppressed even if the stretching is carried out at the upper limit of the temperature, but when the thermoplastic resin is added, the production of voids can be easily suppressed. Besides, when the draw ratio of the films is smaller, the voids are more hardly produced, but there is a lower limit of the draw ratio from the standpoint of the desired physical properties of the resulting stretched films. The polypropylene may be preferably stretched in the draw ratio of at least 4 times. When the inorganic materials are added to the polypropylene, the production of voids can hardly be suppressed, but when the thermoplastic resin is added, the production of voids can easily be suppressed. Thus, the films are stretched at a draw ratio of 4 to 6 times, preferably 4.3 to 5.5 times in the machine direction (longitudinally), and at a draw ratio of 6 to 9 times, preferably 7 to 8 times in the transverse direction (latitudinally). If stretching is effected at a somewhat higher temperature, the production of voids will be suppressed more completely. Thus, the transparency of the film of this invention is extremely good. The uniaxially or biaxially stretched film of the present invention has preferably a thickness of 5 to 100μ.

Prior to the stretching, the film obtained by extruding the polypropylene composition containing the thermoplastic resin dispersed therein may be laminated on a film, i.e. a base layer film, of the polypropylene not containing the thermoplastic resin. For lamination, the polypropylene composition containing the thermoplastic resin and the polypropylene not containing the thermoplastic resin may be simultaneously extruded and then pressed on a cooling drum. In alternative, the polypropylene composition containing the thermoplastic resin may be melt extruded on a film of the polypropylene not containing the thermoplastic resin. In further alternative, a film of the polypropylene composition containing the thermoplastic resin may be combined with a film of the polypropylene not containing the thermoplastic resin. Lamination may be made not only on one surface but on both surfaces of the base layer film so as to provide a laminated film having both non-blocking surfaces. The laminated film is then stretched uniaxially or biaxially.

The thus obtained multi-layer stretched film has fine and minute lumps on the surface and is provided with good slip and non-blocking properties. Further, its transparency is quite good, because the thermoplastic resin which reduces the transparency of the film is not contained in the base layer. Generally speaking, the temperature of the film during stretching is higher at the surface of the film and is lower at the middle part of the film. Accordingly, if any voids are produced during stretching in the film wherein the thermoplastic resin is uniformly dispersed, they will be more easily produced at the inner part thereof than at the surface thereof. Moreover, the improvement of the slip and non-blocking properties of the film is effected by the thermoplastic resin which is present at the surface or at near the surface, but not by the thermoplastic which is present at the inner part of the film. From these viewpoints, there has been proposed such a multi-layer type of film which has a better transparency and excellent slip and non-blocking properties.

Practical and presently preferred embodiments of the invention are illustratively shown in the following Examples wherein parts and percents are by weight, F signifies the surface of the film contacted with the cooling drum and B signifies the other surface.

The properties of the films are measured according to the following methods:

(1) Transmission of all lights (degree of transparency) and Haze: Determined by the method as specified by ASTM D-1003-61. That is, by using an intergrating sphere type apparatus for determining the transmission of light, there are measured the incident light volume ($T_1$), the volume of the all transmitted lights ($T_2$), the volume of the scattered light due to the apparatus ($T_3$) and the volume of the scattered light due to the apparatus and the test piece ($T_4$), and then the transmission of all lights, the transmission of scattered light and the haze are calculated by the following formulae:

$$\text{Transmission of all lights } (T_t) = \frac{T_2}{T_1} \times 100 \; (\%)$$

$$\text{Transmission of scattered light } (T_d) = \frac{T_4 - T_3(T_2/T_1)}{T_1} \times 100 \; (\%)$$

$$\text{Haze} = \frac{T_d}{T_t} \times 100 \; (\%)$$

Generally speaking, the film having an excellent transparency has a transmission of all lights of 85 to 100%, preferably 90 to 98% and a haze of 10% or less, preferably 0.5 to 9.3%, more preferably 0.5 to 5%.

(2) Blocking strength: Two films (each 80 × 120 mm) are overlapped each other sliding the upper end of one of the films 20 mm downward from that of the other, and the overlapped portion is charged with a load of 2 kg/cm² at 50° C. for 48 hours. The thus treated ovelapped films are cut to make pieces of 20 mm in width, and the two films of the piece are forced to slip in the longitudinal direction at 20° C. in the atmosphere of 65% RH at a rate of 200 mm/min with "Tensilon" (manufactured by Toyo Seiki Co., Ltd.) to measure the maximum stress (g), which is recorded as the blocking strength.

(3) Dynamic friction coefficient: Determined according to ASTM D-1894.

EXAMPLE 1

A mixture of polypropylene (90 parts; M.P. 168° C.) and nylon 6 (10 parts; intrinsic viscosity, 3.7; M.P. 215° C.) is supplied into an extruder provided with a screw of 65 mm in diameter rotating at a rate of 50 rpm and a filter consisting of three wire nets of 50, 100 and 50 meshes, and melt extrusion is carried out while maintaining the cylinder of the extruder at 200° C., 240° C., 280° C. and 290° C. respectively in the first, second, third and fourth sections from the supplying side and also keeping the wire net filter and the nozzle respectively at 290° C. and 240° C. The thus obtained master batch is admixed with the same polypropylene as above in various proportions, and the resulting mixture is melt extruded into a film in a conventional manner and cooled by a cooling drum to give an unstretched film of 750μ in thickness. This film is biaxially stretched 4.5 and 7 times at 140° C. and 160° C. respectively in the machine and transverse directions to give a stretched film of 25μ in thickness, of which the surface contacted with the cooling drum (i.e. surface F) is subjected to corona discharge treatment. The physical properties of the thus obtained polypropylene film are shown in Table 1.

Table 1

| | | | | | | | |
|---|---|---|---|---|---|---|---|
| Content of thermoplastic resin (% by weight) | | 0 | 0.025 | 0.05 | 0.1 | 0.2 | 0.5 |
| Average particle size (μ) | | — | 1.2 | 1.2 | 1.3 | 1.4 | 1.5 |
| Haze | F | 0.3 | 0.4 | 0.5 | 0.7 | 1.3 | 3.5 |
| | B | 0.3 | 0.5 | 0.8 | 1.1 | 2.0 | 4.7 |
| | inside | 0.2 | 0.3 | 0.3 | 0.4 | 0.6 | 1.1 |
| | total | 0.8 | 1.2 | 1.6 | 2.2 | 3.9 | 9.3 |
| Blocking strength | F - F | 1630 | 1090 | 720 | 510 | 280 | 40 |

Table 1-continued

| (g) | B - B | 750 | 410 | 280 | 220 | 190 | 0 |
|---|---|---|---|---|---|---|---|
| Dynamic friction | F - F | 0.95 | 0.80 | 0.77 | 0.73 | 0.65 | 0.21 |
| coefficient | B - B | 0.76 | 0.62 | 0.54 | 0.50 | 0.41 | 0.14 |

EXAMPLE 2

The same mixture of polypropylene (90 parts) and nylon 6 (10 parts) as in Example 1 is further mixed with polypropylene so that the content of nylon 6 becomes 0.1% and 1.0% (two mixtures are prepared). The mixtures are each treated in the same manner as in Example 1 to give unstretched films of 750μ in thickness.

The unstretched films are each stretched with a longitudinal stretching machine wherein five preheating rolls of 300 mm, a set of stretching roll and two cooling rolls are provided and the preheating rolls and one roll of the set of stretching roll are operated at a lower speed (lower speed zone) and another roll of the set of stretching roll and the cooling rolls are operated at a higher speed (higher speed zone). The films are firstly passed through the preheating rolls and stretched by passing through the set of stretching roll and then led to the cooling rolls. The stretching is carried out at various surface temperatures of the preheating rolls and at various draw ratios, wherein the speed in the lower speed zone is fixed to 2 m/minute and the speed in the higher speed zone is varied.

The longitudinally stretched films thus obtained have a transmission of all lights and a haze as shown in Table 2.

Table 2

| Content of nylon 6 (%) | Surface temperature of the preheating roll (° C) | Transmission of all lights(%) /haze(%) Draw ratio (times) | | | |
|---|---|---|---|---|---|
| | | 4 | 5 | 7 | 9 |
| 0.1 | 100 | — | 90.2/18.4 | 87.0/31.5 | 83.0/36.8 |
| | 140 | — | — | — | — |
| 1.0 | 100 | — | 75.7/59.0 | 46.1/78.2 | 35.3/82.4 |
| | 140 | 89.0/36.5 | 83.9/53.9 | 51.5/76.1 | 36.2/80.8 |

As is made clear from the above results, the higher draw ratio, the lower temperature of the preheating roll and the higher content of nylon 6 afford the lower transmission of all lights and the higher haze. Since the same unstretched film is stretched, when the film is stretched at a higher draw ratio, the thickness of the stretched film becomes more thin. Nevertheless, the stretched film thus obtained has a lower transmission of all lights and a higher haze, which may be caused by the production of voids within the film.

The longitudinally stretched films obtained above are further latitudinally stretched seven times by a tenter type latitudinal stretching machine under the conditions of the temperature of heated air in the preheating zone: 165° C., the temperature of the stretching zone: 160° C., the temperature of the set zone: 150° C., and the stretching speed: 10 m/minute. The biaxially stretched films thus obtained have a transmission of all lights and a haze as shown in Table 3.

Table 3

| Content of nylon 6 (%) | Surface temperature of the preheating roll (° C) | Transmission of all lights(%) /haze(%) Longitudinal draw ratio (times) | | | |
|---|---|---|---|---|---|
| | | 4 | 5 | 7 | 9 |
| 0.1 | 100 | — | — | — | 88.8/2.4 |
| | 140 | — | — | — | — |
| 1.0 | 100 | — | — | — | 60.0/73.8 |
| | 140 | 91.6/13.2 | 88.5/19.1 | 71.2/48.2 | 63.5/65.7 |

As is made clear from the above results, even under the conditions that the voids are very easily produced, such as the longitudinal draw ratio: 9 times and the temperature of the longitudinal stretching: 100° C., the biaxially stretched film having a content of nylon 6 of 0.1% has a transmission of all lights of 88.8% and a haze of 2.4%, which are within the range that the film has a good transparency. On the contrary, in case of the film having a content of nylon 6 to 1.0%, even under the conditions that the voids are the most hardly produced, such as the longitudinal draw ratio: 4 times and the temperature of the longitudinal stretching: 140° C., the biaxially stretched film has a high transmission of all lights (as 91.6%), but the haze thereof is so high as 13.2%, which means that the film is hardly used as a transparent film. And, under the conditions that the voids are more easily produced, the biaxially stretched films do not have a sufficient transparency.

Thus, for obtaining the desired film having an excellent transparency and good slip and non-blocking properties, not only the components of the starting composition, but also the conditions for forming film therefrom, particularly the stretching conditions, are very important factors.

EXAMPLE 3

Biaxially stretched polypropylene films are prepared in the same manner as in Example 1 but using various kinds of thermoplastic resins in place of nylon 6. The physical properties of the thus obtained films are shown in Table 4.

Table 4

| Thermoplastic resin*) | | A | B | C | D | SiO₂**) |
|---|---|---|---|---|---|---|
| Content (% by weight | | 0.1 | 0.1 | 0.2 | 0.3 | 0.03 |
| Dispersing state | Shape | Cylindrical | Spherical | Irregular | Spherical | Irregular |
| | Average particle size (μ) | Long:2.5 Short:1 | 1 | 2 | 0.7 | 4 |
| Haze | F | 0.4 | 0.7 | 0.5 | 0.9 | 0 |
| | B | 0.5 | 0.8 | 0.8 | 0.5 | 0 |
| | Inside | 0.6 | 0.5 | 0.6 | 1.1 | 4.0 |
| | Total | 1.5 | 2.0 | 1.9 | 2.5 | 4.0 |
| Blocking strength (g) | F - F | 1250 | 700 | 870 | 330 | 410 |
| | B - B | 300 | 290 | 350 | 240 | 200 |
| Dynamic friction coefficient | F - F | 0.75 | 0.70 | 0.81 | 0.77 | 0.79 |
| | B - B | 0.53 | 0.51 | 0.78 | 0.56 | 0.67 |

EXAMPLES 4 to 8

On a film made of a mixture comprising polypropylene (M.P. 168° C.) containing 1% of "Denone 331P" (a nonionic surface active agent manufactured by Marubishi Oil Chemistry Co., Ltd.) and nylon 6 (M.P. 215° C.) (surface layer), the said polypropylene is extruded at 250° C. as a thin layer (base layer) and pressed on a cooling drum at a linear pressure of 15 kg/cm to obtain a laminated film as shown in Table 5.

This laminated film is stretched 4.5 times at 135° C. in the machine direction and then stretched 7 times at 160° C. in the transverse direction. The surface of the surface layer film is subjected to corona discharge treatment. The physical properties of the thus obtained biaxially stretched film are shown in Table 6 in which Examples 4 and 5 are for comparison.

Table 5

| Example No. | Thickness of film(μ) Surface layer | Thickness of film(μ) Base layer | Particle size and mixing proportion of nylon 6 in surface layer | |
|---|---|---|---|---|
| 4 | — | 750 | — | |
| 5 | 750 | — | 1.4 μ | 0.2% |
| 6 | 150 | 600 | 1.4 μ | 0.2% |
| 7 | 450 | 300 | 1.4 μ | 0.2% |
| 8*) | 150 | 450 | 1.4 μ | 0.2% |

Remark:
*)In Example 8, lamination is made on both surfaces of the base layer film.

Table 6

| Example No. | Haze Total | Haze $S_1$*) | Haze $S_2$*) | Haze Inside | Blocking strength $S_1$-$S_1$ | Blocking strength $S_2$-$S_2$ | Dynamic friction coefficient $S_1$-$S_1$ | Dynamic friction coefficient $S_2$-$S_2$ |
|---|---|---|---|---|---|---|---|---|
| 4 | 0.7 | 0.2 | 0.3 | 0.2 | 1680 | 760 | 0.96 | 0.75 |
| 5 | 3.5 | 0.7 | 0.8 | 2.0 | 640 | 280 | 0.71 | 0.56 |
| 6 | 2.3 | 1.6 | 0.2 | 0.5 | 270 | 830 | 0.39 | 0.67 |
| 7 | 2.2 | 0.8 | 0.2 | 1.2 | 590 | 780 | 0.72 | 0.70 |
| 8 | 3.6 | 1.5 | 1.3 | 0.8 | 320 | 50 | 0.51 | 0.42 |

Remark:
*)$S_1$ = The surface of the surface layer treated with corona discharge.
$S_2 = S_2 =$ The opposite surfaces to $S_1$.

What is claimed is:

1. A transparent polypropylene film exhibiting good slip and non-blocking properties prepared by a process including the steps of:
   admixing polypropylene with a thermoplastic resin in the melt state, the thermoplastic resin having a melting point higher than but no more than 100° C. higher than the melting point of the polypropylene and being substantially incompatible with the polypropylene under the mixation conditions, to produce a polypropylene composition wherein the thermoplastic resin is dispersed in the form of fine particles of 0.1 to 10μ in average particle size and the amount of the dispersing thermoplastic resin is from 0.01 to 1% by weight of the polypropylene,
   extruding the polypropylene composition in the melt state into a film, and
   stretching the film at a draw ratio of 4 or more times in at least one direction.

2. A transparent polypropylene film prepared by the process recited in claim 1 wherein the step of stretching the film is carried out at a draw ratio of 4 to 6 times in the machine direction and at a draw ratio of 6 to 9 times in the transverse direction.

3. A transparent polypropylene film prepared by the process recited in claim 1 wherein the step of stretching the film is carried out at a draw ratio of 4.3 to 5.5 times in the machine direction and at a draw ratio of 7 to 8 times in the transverse direction.

4. A transparent polypropylene film prepared by the process recited in claim 2 wherein the melting point of the thermoplastic resin is 30° to 70° C. higher than the melting point of the polypropylene.

5. A transparent polypropylene film prepared by the process recited in claim 2 wherein the step of stretching the film is carried out at film temperatures of 135° to 155° C.

6. A transparent polypropylene film prepared by the process recited in claim 3 wherein the melting point of the thermoplastic resin is 30° to 70° C. higher than the melting point of the polypropylene.

7. A transparent polypropylene film prepared by the process recited in claim 3 wherein the step of stretching the film is carried out at film temperatures of 135° to 155° C.

* * * * *